(12) United States Patent
Cusani

(10) Patent No.: US 6,400,783 B1
(45) Date of Patent: Jun. 4, 2002

(54) METHOD AND APPARATUS FOR TRANSMISSION AND RECEPTION OF DIGITAL SIGNALS AND ESTIMATION OF COMMUNICATION CHANNELS

(75) Inventor: Roberto Cusani, Roma (IT)

(73) Assignee: TELITAL S.p.A., Sgonico (Trieste) (IT)

( * ) Notice: Subject to any disclaimer, the term of this patent is extended or adjusted under 35 U.S.C. 154(b) by 0 days.

(21) Appl. No.: 09/172,617

(22) Filed: Oct. 15, 1998

(30) Foreign Application Priority Data

Oct. 22, 1997  (IT) .......................................... MI97A2376

(51) Int. Cl.[7] ............................................... H04L 7/00
(52) U.S. Cl. ....................................................... 375/354
(58) Field of Search ................................. 375/354, 233, 375/340, 229, 232; 333/28 R

(56) References Cited

U.S. PATENT DOCUMENTS

| | | | | |
|---|---|---|---|---|
| 5,414,734 A | * | 5/1995 | Marchetto et al. | 375/267 |
| 5,436,929 A | * | 7/1995 | Kaleh | 375/233 |
| 5,465,276 A | * | 11/1995 | Larsson et al. | 375/346 |
| 5,790,598 A | * | 8/1998 | Moreland et al. | 375/233 |

FOREIGN PATENT DOCUMENTS

EP            0822673        2/1998

OTHER PUBLICATIONS

Digital Communications, Section 6.8, John G. Proakis, 1989, pp. 642–683.

* cited by examiner

*Primary Examiner*—Chi Pham
*Assistant Examiner*—Khai Tran
(74) *Attorney, Agent, or Firm*—Jacobson Holman, PLLC

(57) ABSTRACT

A method for estimation of a transmission channel and for transmission and reception of digital signals over the channel comprises the steps of transmission of data sequences intercalated with probe sequences, calculation in reception of a channel characteristics estimation for probe sequences received and interpolation of the channel estimation for the data sequences. After obtaining the interpolated estimation the transmission and reception method comprises the additional phase of recognition of received information data by equalizing the data sequences with the interpolation result. An apparatus employing the method has at one end of the channel a device (12) for intercalation of probe sequences between data sequences and at the other channel end a discriminator (16) which separates the probed and data sequences. An estimator (17) estimates the channel for the probe sequences and an interpolator (18) produces the desired interpolated estimation. An equalizer (19) equalizes the data sequence on the basis of the interpolated estimation.

22 Claims, 3 Drawing Sheets a)

b)

c)

METHOD AND APPARATUS FOR TRANSMISSION AND RECEPTION OF DIGITAL SIGNALS AND ESTIMATION OF COMMUNICATION CHANNELS

BACKGROUND OF THE INVENTION

The present invention relates to a method and system in accordance with this method for the implementation of numerical connections in particular through channels dispersive in frequency and rapidly varying in time in addition to being noisy.

The employment of radioelectrical channels for high-speed numerical connections is limited by the presence of intersymbolic interference (ISI) and propagation fading with characteristics generally varying in time and caused by the multiplicity of paths present between the transmitter and the receiver. In this situation the signal received is expressed in the equivalent model (complex) in time-discrete base band (symbol Ts time sampled), as:

$$y(i) = \sum_{m=0}^{L-1} g(i;m)a(i-m) + v(i)$$

where a(i) is the numerical sequence transmitted (e.g. PSK, QAM, GMSK equivalent), v(i) is the added noise (thermal noise plus external interference) and g(i;m), m=0, . . . , L−1 are the L coefficients of the time-variant impulsive response of the transmissive channel including the transmission and reception filters.

In particular the temporal variability of the transmission channel can be induced by the mobility of the transmitter and/or receiver as happens in mobile radio connections where it increases with the speed of the vehicle or by the fluctuations in time of the altitudes of the strata of the atmosphere as is found in HF radio bridges. This variability can be expressed by the coherence time tc which is defined as the interval of time within which the channel does not vary significantly from a statistical view point or, equivalently, in terms of Doppler spread Bd=1/tc. Normalizing tc with respect to the symbol time Ts gives the number Lc=tc/Ts of consecutive symbols for which the channel can be considered nearly constant in time. In HF or mobile radio applications typical values of the product of Bd·Ts go from $10^{-4}$ (slowly varying channel) to $10^{-2}$ (fast channel) up to a maximum of $5 \times 10^{-3}$ or $10^{-2}$ (e.g. for high-speed vehicles like fast trains or planes); contrariwise, for Bd·Ts less than $10^{-4}$ the channel can be considered virtually static.

To obtain satisfactory performance in terms of Bit Error Rate (BER) the presence of ISI makes necessary the use of non-linear equalization techniques. Among these the Maximum Likelihood Sequence Estimation (MLSE) algorithm displays reduced computational complexity thanks, for example, to its implementation by the Viterbi algorithm (MLSE-VA) and for virtually static channels it provides broadly optimal performance since the decision on a certain symbol received takes place on the basis of the symbols either preceding or following it. The MLSE operates on the basis of a decision delay of D samples received where D is generally chosen several times the length L of the impulsive response of the channel. The efficiency of the MLSE solution in its different versions known in the technical literature is such that it is commonly employed to equalize frequency-selective channels, e.g. in GSM receivers.

When the transmission channel varies in time the MLSE must be assisted by a channel estimator which at the beginning of the transmission makes the channel estimation and then during reception of the data continuously updates the estimation which is thus supplied continuously to the MLSE equalizer. This solution is termed adaptive MLSE or AMLSE. The channel estimator typically employs the data decisions at the MLSE output and is commonly implemented by an algorithm of the gradient or a Kalman filter (see for example sec. 6.8 of the book by J. G. Proakis, Digital Communication, second edition, McGraw-Hill, 1989) which is the optimal solution. But in any case the updating takes place with a delay equal to the decision delay D.

It is known that the AMLSE equalizer loses much of its efficiency when the channel varies rapidly in time because the channel estimation is constantly delayed by D symbols with respect to the data and in this interval the channel may have varied in a not negligible manner. To obviate this problem it is possible to supply the channel estimator with low-delay "trial" decisions to then make the final decisions with a greater decision delay. This mitigates but doesn't solve the above mentioned problem because the trial decisions are less reliable than the final ones. Another possible solution is the one based on the so-called Per-Survivor Processing (PSP) which employs an MLSE equalizer in which a different channel estimation is performed for every possible surviving path. This gives significant improvements in performance at the cost however of considerable computational complexity caused by the high number of channel estimators needed.

The general purpose of the present invention is to obviate the above mentioned drawbacks by making available a method and a transmission system applying this method for transmission and reception of numerical signals which would allow high efficiency even in the case of noisy, frequency-dispersive channels rapidly variable in time.

SUMMARY OF THE INVENTION

In view of this purpose it was sought to provide in accordance with the present invention a transmission and reception method for digital signals comprising information data propagated in a communication channel in which are present the following steps. Implement a frame comprising information data sequences to be transmitted spaced by probe sequences consisting of known data, transmit the frame in the channel, receive the frame from the channel, calculate a channel characteristics estimation for probe sequences contained in the received frame, perform for data sequences an interpolation of the channel estimation found for the probe sequence, and perform acknowledgement of information data received equalizing the data sequences by the use as a channel characteristics estimation for the data sequences of the result of the interpolation.

Again in accordance with the present invention it was sought to provide a method for estimation of the characteristics of a communication channel during transmission over it of information data sequences, comprising the following steps. Intercalate with the transmitted data sequences probe sequences consisting of known data, calculate the channel characteristics estimation for probe sequences, interpolate the calculated estimation, and employ the interpolation result as a channel characteristics estimation during reception of information data sequences.

It was also sought to provide an apparatus for transmission and reception of digital signals comprising information data propagated in a communication channel characterized in that it comprises a transmitting apparatus and a receiving apparatus at the two ends of the channel with the transmitting apparatus comprising in turn an intercalating device receiving at input the information data to be transmitted and outputting a frame made up of information data sequences to be transmitted intercalated with probe sequences consisting of known data and a transmitter for sending the frame over the channel with the receiving apparatus comprising in turn a receiver for reception of the frame from the channel with a discriminator separating the probe sequences and the data sequences from the received frame, an estimator receiving at input the probe sequences and supplying at output the channel estimation characteristics for the received probe sequences, an interpolator receiving at input the estimation output by the estimator and producing by interpolation the desired channel characteristics estimation for the data sequences and an equalizer receiving the estimation output by the interpolator and equalizing on the basis thereof the data sequence extracted from the discriminator to output the correct sequence of transmitted data.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
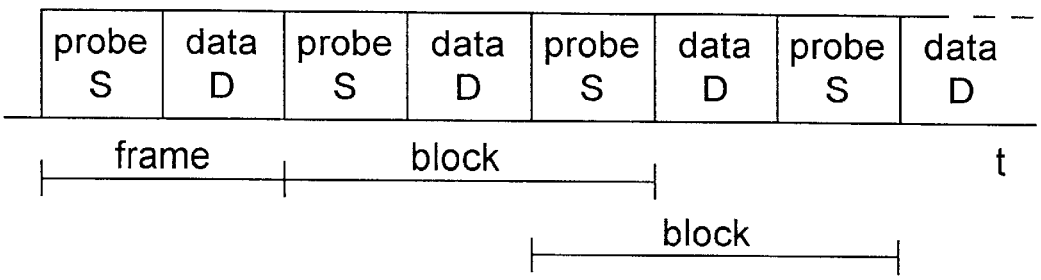
FIG. 1 shows transmitted frame structures provided in accordance with the present invention.
Figure 1:
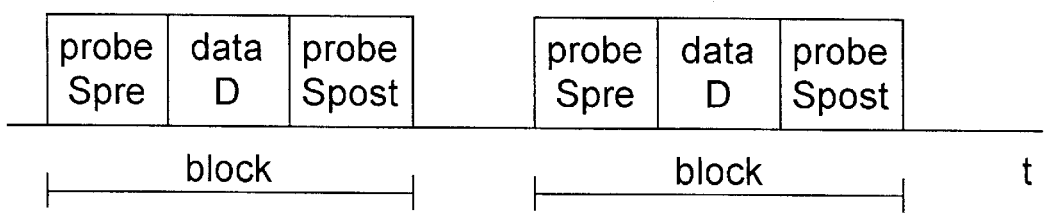
Figure 1:
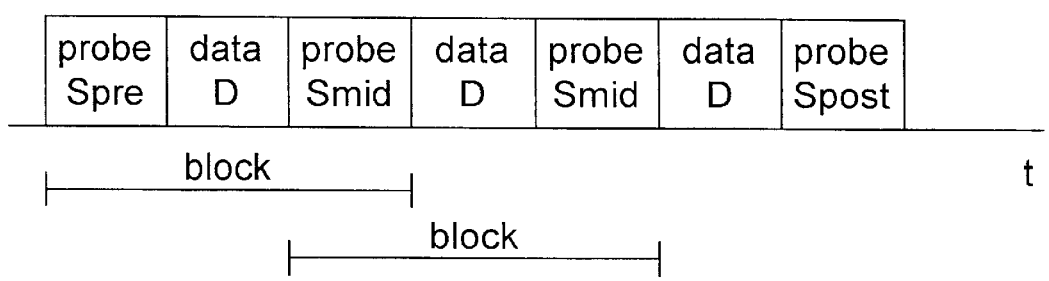

In accordance with the present invention with the information data or data sequences transmitted are intercalated probe sequences or probe data as shown by way of example in FIG. 1. The probe data are known a priori and can be intercalated in a variety of manners depending also on the structure of the information data which it is desired to transmit, on the transmission channel coherence time and on the reception noise level.

For example, in FIG. 1a transmission of the data consisting of PSK or QAM symbols is structured like a continuous sequence of symbols in which the sequences of information data D consisting of a number of symbols defined by Ldata are alternated with probe sequences S consisting of a number of symbols defined by Lprobe. Each probe sequence acts either as a preamble for the data following it or postamble for the data preceding it. A data sequence and the probe sequence preceding it constitute a "frame" formed of a number of Lfra symbols equal to Lfra=Lprobe+Ldata. The durations in time of the frame, probes and data between the probes are thus respectively equal to Tfra=Ts×Lfra, Tprobe=Ts×Lprobe and Tdata=Tfra−Tprobe with Ts=time symbol. A block of symbols can be seen as the assembly of a block of data and the immediately preceding and following probe sequences. Successive blocks of data thus defined are therefore superimposed and have in common the probe sequence between them.

In FIG. 1b transmission takes place in independent blocks consisting each of a preamble of probe data Spre, information data D and a postamble of probe data Spos. The number of preamble symbols Lpre and postamble symbols Lpost can be equal mutually and to Lprobe.

In FIG. 1c the transmission takes place in consecutive blocks, i.e. one or more consecutive blocks are transmitted separated by intermediate probe sequences (termed "midambles") Smid to form independent "packages" starting with a preambular probe sequence and a postambular probe sequence. The number of midambular symbols can be equal to the number or preambular and postambular symbols.

For the sake of simplicity, by the words "preambular and postambular probe sequences" is meant the pair of probe sequences between which there is an information data sequence regardless of the fact that they are in reality intermediate probe sequences or probe sequences which are simultaneously preambular for the following data sequence and postambular for the preceding data sequence.

In accordance with the present invention, upon reception of the signal the channel is estimated for only the probe sequences. The estimation thus found is interpolated to obtain a channel estimation for the data sequences. The interpolation can be advantageously linear. The channel estimation thus found is employed to perform equalization of the information data output by the receiver.

Figure 4:
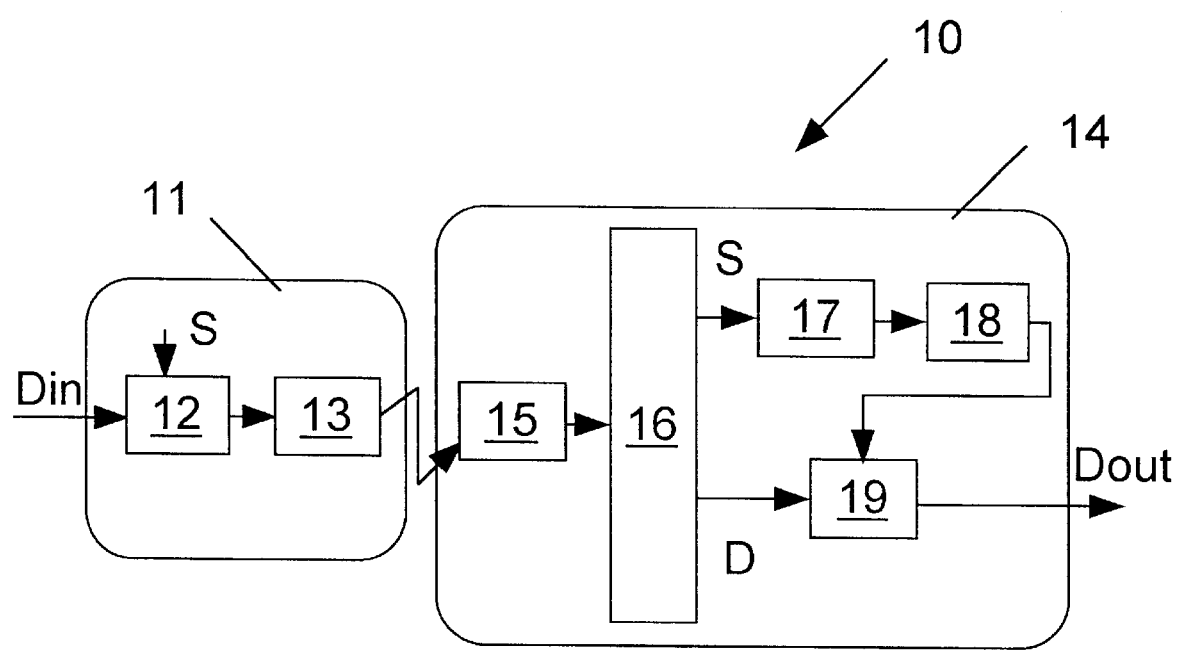
FIG. 4 shows a block diagram of a possible digital signal transmission and reception system applying the present invention.

A transmission system in accordance with the present invention is shown in the block diagram of FIG. 4 and indicated generically by reference number 10. The transmitting part 11 receives a numerical sequence of information data Din to be transmitted (e.g. PSK, QAM, GMSK-equivalent etc.). An intercalator 12 introduces into the Din sequence the probe sequences S to provide a predetermined frame structure to be transmitted (continuous, with independent blocks, consecutive blocks etc). The output of the intercalator is started at a signal transmission block 13. Intercalator and transmission block are known in themselves and readily imaginable for those skilled in the art and are according not further described or shown.

The receiving part 14 comprises in turn a receiving block homologous with the transmitting block 13. The received signal is sent to a discriminator 16 which separates the probe and data sequences. The probe sequences are sent to an estimator 17 which outputs the channel estimation for the received probe sequences. The estimation is sent to an interpolator 18 which produces the desired channel estimation for the data sequences. The latter estimation is sent to an equalizer 19 which on the basis thereof equalizes the received data sequence and outputs the correct data Dout to the transmission system.

It has been found advantageous that the received sequence be encoded with channel coding of the known Trellis type or the convolutional type. It has also been found advantageous that the received sequence be subjected in transmission to codification of the differential type or with interlacing.

The algorithm for channel estimation during the probe sequence should be chosen from among the estimation algorithms with the characteristic of converging rapidly on the estimated value in addition to giving rise to a small estimation error of course. In this manner the Lprobe length is kept small and consequently high Ldata/Lfra transmission efficiency is achieved.

For this purpose any fast estimator, e.g. of the Kalman type, can be used. But the Kalman-type non-linear recursive adaptive estimator described in European patent application Ser. No. 97 202 349.3 filed Jul. 25, 1997 in the version related to known input data has been verified as being particularly advantageous. With this estimator the best performance was achieved in terms of estimation precision and convergence speed.

Briefly, the estimator is based on the following recursive procedure which is valid in general for complex modulations of the QPSK or GMSK-equivalent type. The steps of the procedure are as follows.

0) Let $x(i)=[a(i), \ldots, a(i-L+l1)]^T$ be the L-dimensional vector (complex) of the "status" of the channel at the ith instant known to the receiver because the transmitted data $a(i)$ belong to the probe sequence and let $g(i)=[g(i;0), \ldots, g(i;L)]^T$ be the vector of the channel coefficients at ith instant. Here and hereinafter $v^T$ indicates transposition of vector v.

1) In step ith calculate as $g\hat{}(i/i-1)=A\ g\hat{}(i-1/i-1)$ the prediction (one step) of g(i), i.e. the estimation of g(i) based on the observations up to the step (i-1)th, where $g\hat{}(i-1/i-1)$ is the "filtered" estimation of g(i) found in the preceding step (i-1)th while A is the channel status transition matrix, real and having dimensions L×L, whose elements are found by modeling the channel process as a first order autoregressive process (vectorial, with dimensions L). The "filtered" estimation is initialized in the initial step (i.e. for the beginning of the probe sequence) as described below.

2) Calculate recursively the L×L matrix of the covariances of the channel prediction error as:

$$Sg(i/i-1)=A[I_{L\times L}-K(i-1)x^T(i-1)]Sg(i-1/i-2)A^T++2[R_g(O)-AR_g(O)A^T],$$

where $R_g(0)$ is the covariance matrix of the channel process g(i), K(i−1) is the filter gain found in the preceding step and $I_{L\times L}$ is the identity matrix with dimensions L×L.

3) Calculate the filter gain as:

$$K(i)=[Sg(i/i-1)M^*\times(i)/\{N_0+x(i)^TM^HSg^*(i/i-1)Mx(n)\}$$

where M is the "mapping" L×N matrix associated with the N possible statuses of the channel while $N_0$ is the noise power spectral density. Here and below the notation B* indicates the conjugate of a matrix or vector B.

4) Calculate the "filtered" estimation of g(i) as:

$$g\hat{}(i/i)=g\hat{}(i/i-1)+K(i)[y(i)-g\hat{}(i/i-1)^TMx(i)]$$

5) If the end of the probe sequence is reached $g\hat{}(i/i)$ constitutes the channel estimation associated therewith; otherwise increase the index i and return to step 1).

It has been found advantageous to transmit the preambles in the simple BPSK format, i.e. on two levels, whatever be the modulation format (e.g. QPSK) employed for transmitting the information data. Indeed, in this manner the channel estimation is just as good as with QPSK which however is more onerous from a computational viewpoint. Bigger modulation formats give rise to less accurate channel estimations.

In addition, the precision in the channel estimation at the end of the probe sequence can be improved by repeating the above described estimation several times always employing the same probe sequence but starting each time from the estimation found at the end of the preceding iteration. In this manner there can be obtained convergence of the channel estimation algorithm even when Lprobe is small and a single iteration is insufficient for achieving convergence.

As mentioned above, the information data channel estimation is found as the probe sequence channel estimation interpolation.

To obtain this, the channel is estimated on the basis both of the preceding probe sequence and of the probe sequence which follows an information data sequence.

The behavior of the channel for the Ldata information symbols present between the two probes is reconstructed by means of an interpolation algorithm. It has been found advantageous to employ a simple linear interpolation algorithm as illustrated graphically in FIG. 2 in which is shown a possible trajectory (drawn in solid lines) of the real part Re{g(i;m)} or the imaginary part Im{g(i;m)} of the generic channel coefficient g(i;m). For the sake of simplicity this real or imaginary part is still indicated here with g(i;m) without thereby introducing ambiguity or confusion.

Figure 2:
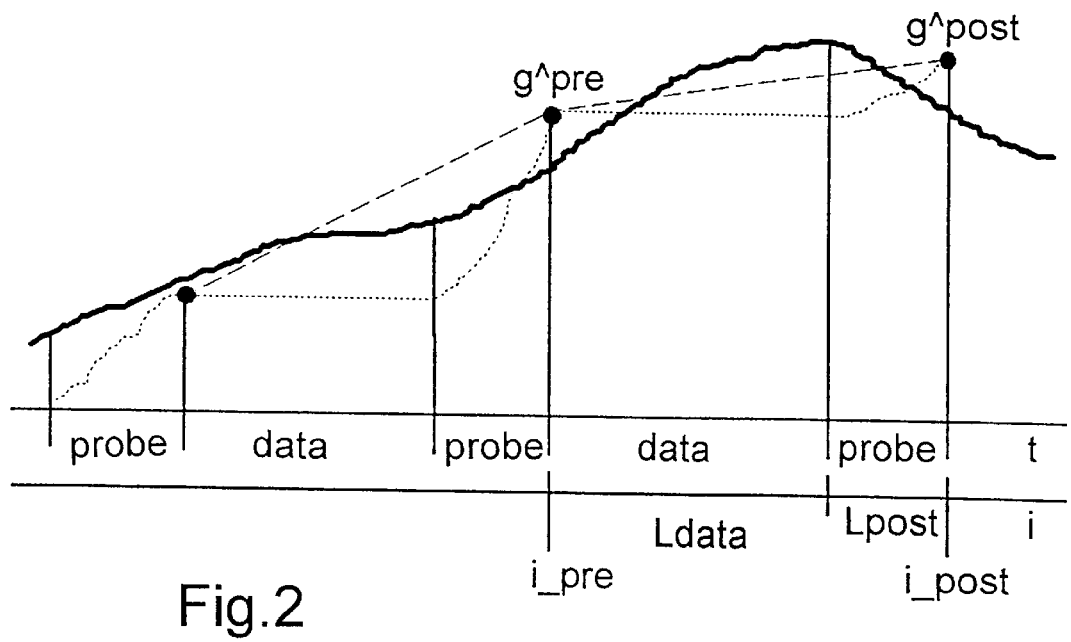
FIGS. 2 and 3 show graphs of the channel estimation produced in accordance with two possible variants of the present invention.

The channel estimator follows the trajectory for the preambular and postambular probe sequences (in the figure possible estimation trajectories are drawn in broken lines) and gives at the end thereof the estimations g^pre and g^post respectively. With reference to FIG. 2, using a linear interpolation the trajectory of g(i;m) (in broken lines in the figure) is reconstructed as:

$$g(i;m) = \frac{(g\hat{}post(i - i\_pre) + g\hat{}pre[Ldata + Lpre - (i - i\_pre)])}{(Ldata + Lpre)}$$

where i_pre is the preamble end instant and therefore the postamble end instant is i_pre+Ldata+Lpost.

Since the above described linear interpolation tends to lose precision far from the g^pre and g^post estimations, i.e. in the center of the data block, it is possible to repeat once more the channel estimation algorithm starting however from the g^post estimation and travelling over the postamble in the opposite direction to its initial point.

Figure 3:
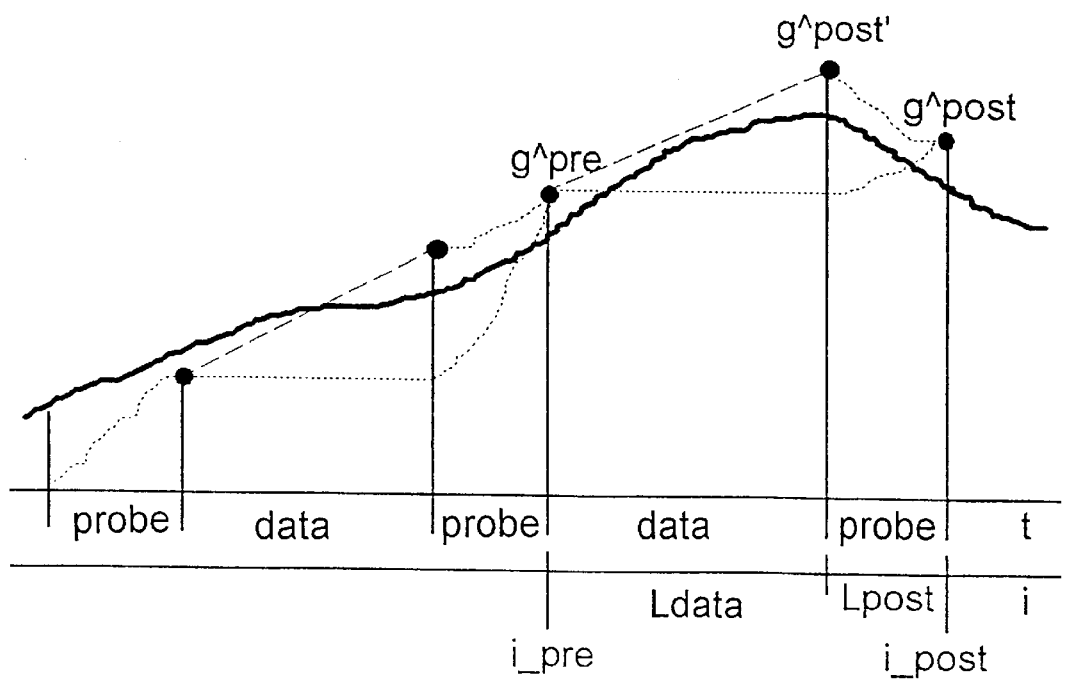

The estimation thus found g^post'is employed for the linear interpolation instead of g^post in a manner similar to that described above. This is shown graphically in FIG. 3. Once the channel estimation has been found by interpolation for the data sequence recognition of the data can take place by an appropriate version of the known algorithm MLSE-VA with decision delay D by using said channel interpolated estimation symbol by symbol. In particular the metrics for the VA decision trellis stage for the ith instant are calculated step-by-step using the channel estimation for that same instant. The VA departs from a known initial status calculated on the basis of the last known preamble symbols and terminates with a known final status calculated on the basis of the first known postambular symbols.

Channel estimation for the probe sequences, interpolation of the channel estimation for the information data and recognition of the data are repeated iteratively for reception of the following blocks. If transmission is in continuous sequence as shown in FIG. 1a or with consecutive blocks separated by midambles as in FIG. 1c the g^post estimation constitutes the g^pre of the following block which therefore does not need to be recalculated. With every iteration the channel is therefore estimated for the postamble while the preamble estimation is already available. This helps decrease the. computational complexity of the method in accordance with the present invention.

At the beginning of the probe sequence it is necessary to initialize the channel estimation and the corresponding error matrix Sg(i/i−1). In the case of continuous sequence transmission as shown in FIG. 1a or in consecutive blocks as in FIG 1c and if Tdata is not greater than the channel coherence time tc the recursive channel estimator can advantageously be initialized with the channel estimation found for the preceding probe sequence which constitutes a good initial approximation and gives rise to a fast convergence (as may be seen in FIG. 2) so that Lprobe can be chosen relatively small.

For the first probe sequence transmitted the channel estimator is initialized at zero and it can be expected to employ for this probe sequence a probe sequence a bit longer than the following probes.

Again in the case of continuous sequence or consecutive block transmissions and for Ldata so high it is assumed that the channel varies considerable from one probe to the next it was found more appropriate to initialize the recursive channel estimator at zero at the beginning of each probe. The probe sequences must then have a length Lprobe sufficient to ensure convergence possibly even using the expedient of repeating the estimation several times always employing the same probe sequence but starting each time from the estimation found at the end of the preceding iteration.

In the case of a transmission with independent data blocks like that shown in FIG. 1b the channel is in general much different from one block to another among other reasons because different blocks could be transmitted on bands with different frequencies as in so-called frequency hopping, and the channel estimator must be initialized at zero for the preamble. In this case it is possible to provide the use of a preamble slightly longer than the postamble.

In all the cases described above the covariance matrix of the prediction error Sg(i/i−1) is initialized as equal to the covariance matrix of the error between the initial value assumed for the channel and the true value of the channel.

However the structure of the frame transmitted is composed—formed of probe sequences and information data—it has been found particularly advantageous that Lprobe be rather small compared with Ldata so that the transmission efficiency Ldata/Lfra is between 30% and 90% or even more and in particular al least greater than 50%.

But Lprobe must be high enough to allow convergence of the iterative estimation algorithm described above, possibly repeating the estimation several times always using the same probe sequence but starting each time from the estimation found at the end of the preceding iteration, and to supply a good channel estimation when there is noise. On this subject it should be clarified that since the channel estimator described above by way of example requires that the status of the channel be known, in reality the estimation can depart only from the Lth symbol of the probe sequence, of which a number of symbols equal to Lprobe−L+1 instead of Lprobe are thus used.

Ldata must not be too big, otherwise the channel could vary considerably from one preamble to the next and thus reduce the precision of the following interpolation. Since the data decision takes place only after having received the postamble, i.e. with a delay of Tdata+Tprobe, to which must be added the decision processing time, Ldata must not be too high so as to keep this delay within the system specifications.

At this point is its clear that the preset purposes have been achieved allowing transmission and reception with excellent results of digital signals which propagate in a communication channel with multiple time-variant paths which give rise to time and frequency distortions. The transmission strategy provided in accordance with the present invention is based on the observation that, even for very high Bd·Ts values (e.g. up to $10^{-2}$) the properties of the channel vary slowly with respect to the symbol frequency. Consequently it is possible to measure periodically on the basis of the probe sequences the values assumed by the channel coefficients g(i;m) and then reconstruct its behavior between one probe and the next (i.e. for information data transmission) by means of an appropriate interpolation.

If Ldata is not high, the linear interpolation supplies a good channel estimation along the data sequence because, virtually, the curve which constitutes the channel trajectory is approximated by a succession of rather short rectilinear segments.

In addition, it is efficient not to use the data decisions which in the presence of decision errors reduce the precision of the estimation in the prior art systems. Not using the information data decisions there is also found considerable reduction of the computational load with respect to the case of an adaptive equalizer performing the channel estimation along the entire received sequence, including the information data.

The computational complexity of the channel estimator can be considered virtually the same as the classical Kalman's estimator, in its version for real data (but complex channel) if the modulation is the BPSK type or, in any case, if the BPSK format is employed, i.e. two level, for the probe sequences.

The computational load is in reality less because the channel estimator is active only for the probe sequence. The complexity of the MLSE equalizer with delay D is the conventional complexity of the VA. The method and device in accordance with the present invention are therefore easy to implement using normally available circuits and technical solutions.

Naturally the above description of an embodiment applying the innovative principles of the present invention is given by way of non-limiting example of said principles within the scope of the exclusive right claimed here. For example the estimator could be different from that described as the interpolation technique used could be different even though both were found advantageously useful in the above described form.

What is claimed is:

1. A method for transmission and reception of digital signals having information data which propagate in a communication channel including the following steps:

a) providing a frame including information data sequences to be transmitted spaced by probe sequences made up of known data;

b) transmitting the frame in the channel;

c) receiving the frame from the channel;

d) calculating a channel characteristics estimation for the probe sequences contained in the received frame;

e) performing for data sequences an interpolation of the channel estimation found in accordance with step d) above;

f) performing recognition of information data received equalizing the data sequences by using the interpolation result as the data sequence channel characteristics estimation; and performing recognition of the information data by means of Maximum Likelihood Sequence Estimation (MLSE) algorithm with decision delay D using said channel interpolated estimation symbol by symbol.

2. The method in accordance with claim 1, wherein the frame comprises data blocks made up of an information data sequence preceded by a preambular probe sequence and followed by a postambular probe sequence.

3. The method in accordance with claim 2, wherein each data block has postambular probe sequences constituting preambular probe sequences for an immediately following data block.

4. The method in accordance with claim 3, wherein the data blocks are organized in block packages with each package being separated in time from the preceding and following packages.

5. The method in accordance with claim 1, wherein the interpolation is a linear interpolation performed on the basis of the estimation of probe sequences immediately preceding and following the data sequence.

6. The method in accordance with claim 5, wherein the channel estimation for the probe sequence following the data sequence is found traversing said probe sequence in the opposite direction.

7. The method in accordance with claim 5, wherein a trajectory g(i;m) of the generic channel coefficient for a data sequence is interpolated linearly as:

$$g(i; m) = \frac{(g\char`\^ post(i - i\_pre) + g\char`\^ pre[Ldata + Lpre - (i - i\_pre)])}{(Ldata + Lpre)}$$

where g^pre and g^post are the estimations calculated for the preambular and postambular probe sequences respectively before and after the data sequence, i_pre is the end of the preamble instant, Ldata is the length of the data sequence, and Lpre is the length of the preamble.

8. The method in accordance with claim 1, wherein the channel characteristics estimation for the probe sequences is performed by means of an adaptive non-linear recursive Kalman filter.

9. The method in accordance with claim 8, wherein the Kalman filter is based on the recursive procedure of:
   a) in step ith calculating as g^(i/i−1)=A g^(i−1) the prediction (one step) of g(i), wherein the estimation of g(i) based on the observations up to the step (i−1)th, where g^(i−1/i−1) is the "filtered" estimation of g(i) found in the preceding step (i−1)th while A is the channel status transition matrix, real and having dimensions L×L, whose elements are found by modeling the channel process like a first order autoregressive process (vectorial, with dimensions L);
   b) calculating recursively a L×L matrix of the covariances of the channel prediction error as:

$$Sg(i/i-1)=A[I_{L\times L}-K(i-1)x^T(i-1)]Sg(i-1/i-2)A^T++2[R_g(O)-AR_g(O)A^T],$$

where $R_g(0)$ is the covariance matrix of the channel process g(i), K(i−1) is a filter gain found in the preceding step and $I_{L\times L}$ is the identity matrix with dimensions L×L;
   c) calculating the filter gain as:

$$K(i)=[Sg(i/i-1)M^*x(i)/\{N_0+x(i)^TM^Hsg^*(i/i-1)Mx(n)\}$$

where M is the "mapping" L×N matrix associated with the N possible statuses of the channel while $N_o$ is the noise power spectral density;
   d) calculating the "filtered" estimation of g(i) as:

$$g\char`\^(i/i)=g\char`\^(i/i-1)+K(i)[y(i)-g\char`\^(i/i-1)^TMx(i)]$$

e) if the end of the probe sequence is reached, g^(i/i) constitutes the channel estimation associated therewith; otherwise increasing the index i and return to step a).

10. The method in accordance with claim 9, wherein if the duration in time of a data sequence Tdata is not greater than a channel coherence time tc the recursive procedure is initialized with the channel estimation found for a preceding probe sequence.

11. The method in accordance with claim 9, wherein the recursive procedure is initialized at zero at the beginning of each probe sequence.

12. The method in accordance with claim 1, wherein the recognition of the information data is further performed by means of Maximum Likelihood Sequence Estimation-Viterbi with decision delay D using said channel interpolated estimation symbol by symbol.

13. The method in accordance with claim 12, wherein a metrics for the decision trellis stage of the [VA] viterbi algorithm corresponding to the ith instant are calculated step-by-step using the channel estimation for that same instant with the viterbi algorithm departing from a known initial status calculated on the basis of the last symbols of a probe sequence immediately preceding the data sequence and terminates with a known final status calculated on the basis of the first symbols of a probe sequence immediately following the data sequence.

14. The method in accordance with claim 1, wherein the received frame is encoded with trellis channel coding.

15. The method in accordance with claim 1, wherein the received frame is encoded with a convolutional channel coding.

16. The method in accordance with claim 1, wherein the frame is subject in transmission to differential encoding 17.

17. The method in accordance with claim 1, wherein the frame is subject in transmission to interlacing.

18. The method in accordance with claim 1, wherein the probe sequences are modulated with binary modulation and the data sequences are modulated with higher order modulation.

19. The method in accordance with claim 1, wherein the channel estimation at the end of a probe sequence is found recursively by repeating several times the channel estimation for the probe sequence and always employing the same probe sequence but departing each time from the estimation found at the end of the preceding iteration.

20. A method for estimation of the characteristics of a communication channel during transmission over it of information data sequences comprising the following steps:
   intercalating probe sequences consisting of known data with the data sequences transmitted;
   calculating the channel characteristics estimation for probe sequences;
   interpolating the calculated estimation;
   employing the result of the interpolation as a channel characteristics estimation during reception of information data sequences
   performing recognition of the information data by means of Maximum Likelihood Sequence Estimation algorithm with decision delay D using said channel interpolated estimation symbol by symbol.

21. The method in accordance with claim 20, wherein for a data sequence, the interpolation is a linear interpolation performed starting from the channel characteristics estimation for a probe sequence immediately preceding and a probe sequence immediately following the data sequence.

22. An apparatus for transmission and reception of digital signals comprising information data propagated in a communication channel and having a transmitting apparatus and a receiving apparatus at the two ends of the channel; with the transmitting apparatus including
   an intercalating device receiving at input the information data to be transmitted and outputting a frame made up of information data sequences to be transmitted intercalated with probe sequences consisting of known data;
   a transmitter for sending the frame over the channel with the receiving apparatus including a receiver for reception of the frame from the channel;

a discriminator separating the probe sequences and the data sequences from the received frame;

an estimator receiving at input the probe sequences and supplying at output the channel characteristics estimation for the received probe sequences;

an interpolator receiving at input the estimation output by the estimator and producing by interpolation the desired channel characteristics estimation for the data sequences;

an equalizer receiving the estimation output by the interpolator and equalizing on the basis thereof the data sequence extracted from the discriminator to output the correct transmitted data sequence; and performing recognition of the information data by means of Maximum Likelihood Sequence Estimation (MLSE) algorithm with decision delay D using said channel interpolated estimation symbol by symbol.

* * * * *